United States Patent
Hoffmann et al.

(10) Patent No.: US 12,136,782 B2
(45) Date of Patent: Nov. 5, 2024

(54) ARRANGEMENT FOR PLUG-CONNECTING ELECTRICAL CONNECTIONS, AND DEVICE FOR DRIVING A COMPRESSOR WITH THE ARRANGEMENT

(71) Applicant: Hanon Systems, Daejeon (KR)

(72) Inventors: Michael Hoffmann, Cologne (DE); Bernd Guntermann, Lennestadt (DE)

(73) Assignee: HANON SYSTEMS, Daejeon (KR)

( * ) Notice: Subject to any disclaimer, the term of this patent is extended or adjusted under 35 U.S.C. 154(b) by 258 days.

(21) Appl. No.: 17/755,177

(22) PCT Filed: Jan. 14, 2021

(86) PCT No.: PCT/KR2021/000559
§ 371 (c)(1),
(2) Date: Apr. 22, 2022

(87) PCT Pub. No.: WO2021/149972
PCT Pub. Date: Jul. 29, 2021

(65) Prior Publication Data
US 2022/0399677 A1 Dec. 15, 2022

(30) Foreign Application Priority Data

Jan. 21, 2020 (DE) .................... 10 2020 101 303.5
Oct. 14, 2020 (DE) .................... 10 2020 126 962.5

(51) Int. Cl.
*H01R 13/52* (2006.01)
*B60H 1/00* (2006.01)
(Continued)

(52) U.S. Cl.
CPC ..... *H01R 13/5202* (2013.01); *B60H 1/00428* (2013.01); *F04C 18/0215* (2013.01);
(Continued)

(58) Field of Classification Search
CPC .. H01R 12/55; H01R 13/5202; H01R 13/533; H01R 13/621; H01R 13/629; H02K 5/225; H02K 5/22; B60H 1/00428
See application file for complete search history.

(56) References Cited

U.S. PATENT DOCUMENTS 5,454,733 A * 10/1995 Watanabe ............ H01R 13/514
439/701
6,257,918 B1 * 7/2001 Yamamoto ......... H01R 13/6315
439/378
(Continued)

FOREIGN PATENT DOCUMENTS

CN 101453089 A 6/2009
CN 101713397 A 5/2010
(Continued)

*Primary Examiner* — Marcus E Harcum
(74) *Attorney, Agent, or Firm* — Shumaker, Loop & Kendrick, LLP; James D. Miller

(57) ABSTRACT

An arrangement for plug-connecting electrical connections through a housing, in particular a device for driving a compressor. The arrangement exhibits at least one plug-in connection with at least one plug-in connector for transmitting electrical energy, as well as one mounting element for mounting the at least one plug-in connector. The mounting element can be fixed on the housing. The mounting element exhibits on one inner surface of the housing, which encloses the volume, an opening for mounting a fastening element for fixing the mounting element on the housing. The opening is produced in such a way that it starts from the inner surface, extends into the mounting element and ends in the mounting element. The fastening element is arranged in such a way that it is inserted into the opening from the volume enclosed by the housing through a pass-through opening, that is produced in the housing.

23 Claims, 9 Drawing Sheets

(51) Int. Cl.
  *F04C 18/02* (2006.01)
  *H01R 12/55* (2011.01)
  *H01R 13/621* (2006.01)
  *H01R 13/629* (2006.01)
  *H02K 5/22* (2006.01)
  *H01R 13/516* (2006.01)

(52) U.S. Cl.
  CPC ........... *H01R 12/55* (2013.01); *H01R 13/621* (2013.01); *H01R 13/629* (2013.01); *H02K 5/225* (2013.01); *F04C 2240/403* (2013.01); *F04C 2240/803* (2013.01); *F04C 2240/805* (2013.01); *F04C 2240/808* (2013.01); *H01R 13/516* (2013.01)

(56) References Cited

U.S. PATENT DOCUMENTS

| | | | | |
|---|---|---|---|---|
| 7,341,484 | B2* | 3/2008 | Yamamoto | H01R 13/5202 439/271 |
| 7,618,286 | B2* | 11/2009 | Aoki | H01R 13/652 439/587 |
| 8,414,330 | B2* | 4/2013 | Yamada | H01R 13/4226 439/579 |
| 9,627,785 | B1* | 4/2017 | Melchor Saucedo | H05K 7/026 |
| 10,028,391 | B1* | 7/2018 | Reynoso Galvan | H05K 5/0052 |
| 10,211,570 | B2* | 2/2019 | Tanaka | H01R 13/6215 |
| 10,290,974 | B2* | 5/2019 | Ishibashi | B60L 15/007 |
| 10,476,209 | B2* | 11/2019 | Kitagawa | H01R 13/639 |
| 11,171,440 | B2* | 11/2021 | Durse | H01R 13/743 |
| 2002/0155756 | A1* | 10/2002 | Yoshioka | H01R 13/648 439/607.01 |
| 2005/0130487 | A1 | 6/2005 | Bartholoma et al. | |
| 2005/0196285 | A1 | 9/2005 | Jayanth | |
| 2009/0149048 | A1 | 6/2009 | Pavlovic et al. | |
| 2011/0076162 | A1* | 3/2011 | Heidecker | H01R 13/5219 417/313 |
| 2012/0238134 | A1* | 9/2012 | Matsuoka | H01R 13/405 439/587 |
| 2014/0106619 | A1* | 4/2014 | Okamoto | H01R 13/6596 439/607.58 |
| 2015/0136471 | A1 | 5/2015 | Muehlmichel et al. | |
| 2018/0358740 | A1* | 12/2018 | Yamanashi | H01R 13/512 |
| 2019/0123471 | A1* | 4/2019 | Blakborn | H01R 13/44 |
| 2020/0194949 | A1* | 6/2020 | Egawa | H01R 13/4364 |
| 2021/0036457 | A1* | 2/2021 | Aoki | H01R 13/748 |

FOREIGN PATENT DOCUMENTS

| | | | |
|---|---|---|---|
| CN | 106953196 A | 7/2017 | |
| EP | 2866308 A1 * | 4/2015 | ........... H01R 13/621 |
| JP | 2007192720 A | 8/2007 | |
| JP | 2011103259 A | 5/2011 | |
| KR | 20160137130 | 11/2016 | |
| KR | 20160137130 A | 11/2016 | |
| KR | 101745729 B1 | 6/2017 | |

* cited by examiner

ARRANGEMENT FOR PLUG-CONNECTING ELECTRICAL CONNECTIONS, AND DEVICE FOR DRIVING A COMPRESSOR WITH THE ARRANGEMENT

CROSS REFERENCE TO RELATED APPLICATIONS

This is a U.S. national phase patent application of PCT/KR2021/000559 filed Jan. 14, 2021 which claims the benefit of and priority to German Pat. Appl. No. 10 2020 101 303.5 filed on Jan. 21, 2020 and German Pat. Appl. No. 10 2020 126 962.5 filed Oct. 14, 2020, the entire contents of each of which are incorporated herein by reference.

TECHNICAL FIELD

The invention relates to an arrangement for plug-connecting electrical connections through a housing, in particular to a device for driving a compressor, such as an electric motor, specifically for compressing a vaporous fluid, such as a refrigerant. The arrangement exhibits at least one plug connection with at least one plug-in connector for transmitting electrical energy, and one mounting element for accommodation of the plug-in connector. The mounting element can be fixed on the housing.

Furthermore, the invention relates to a device for driving a compressor, in particular an electric motor, with the arrangement for plug-connecting electrical connections, and a method for mounting the arrangement on the device for driving the compressor. The compressor can be used in a refrigerant circuit of a motor vehicle air-conditioning system.

BACKGROUND ART

Compressors for mobile applications known from prior art, in particular for motor vehicle air-conditioning systems, and used to convey refrigerant through a refrigerant circuit, which are also called refrigerant compressors, are often produced as piston compressors with variable displacement or as scroll compressors, independently of the refrigerant, wherein the compressors are driven either via a pulley or electrically.

An electrically driven compressor exhibits, in addition to the electric motor for driving the appropriate compressing mechanism, an inverter for driving the electric motor. The inverter serves to convert direct current of a vehicle battery into three-phase current that is supplied to the electric motor via electrical connections.

The inverter exhibits plug connections for plug-in connectors for electrical connection to connections of the electric motor, which are produced as pins that, in turn, are electrically connected with connection lines of conducting wires of the coils of the stator. The connections of the electric motor are produced in a connector housing that is arranged on an end face of the stator, which is aligned in the axial direction of the stator.

The plug-in connectors that are arranged on the inverter or on a printed-circuit board of a switching device of the compressor and outside a housing of the compressor and produced as pins are inserted during the assembly of the compressor into a connection terminal intended in one of the connector housings and are each brought into contact with an end piece that is connected to an appropriate conducting wire, in particular a connection line of the conducting wire.

The plug-in connectors inserted through the housing to the inverter arranged outside the housing must be sealed.

Conventionally, the electrically driven compressors are produced with one plug-in connection each for connections for transmitting electrical energy and communication signals in the low-voltage area, and with one plug connection each for connections for transmitting electrical energy in the high-voltage area, which are connected to the housing by way of a plurality of screwed connections and with one sealing element or several sealing elements. Consequently, the two plug-in connections, that are to be installed separately, and the power supply, as well as the plug-in connections that ensure the communication are assembled by way of a plurality of screws and sealing elements, in particular two axial seals and two radial seals.

The great number of the separate sealing elements, and the screwed connections that are mounted from outside on the housing of the compressor, as well as their arrangement and formation lead to a high risk of contamination, which increases the manufacturing costs and assembly times. Furthermore, the screwed connections require a minimal mounting space on the housing to be able to insert the screws from outside into the housing.

DE 10 2015 119 131 A1 describes a plug-in connector arrangement with one first electrical plug-in connector and one second electrical plug-in connector. The plug-in connectors exhibit each a housing with one input and one output. At least one of the housings encloses an internal space in which busbars are arranged between the input and the output. The housings of the two plug-in connectors are connected to one another as a common plastic injection molded part.

The plug-in connections known from prior art, which exhibit a great number of components and thus a large mounting space, require long assembly times since, in addition, the possible mounting space inside the housing of the compressor and hence also the mounting space for the electrical plug-in connections are very small. Furthermore, the plug-in connections that are produced from the plurality of components lead to high material costs, manufacturing costs, and storage costs.

SUMMARY

The task of the invention is to provide an arrangement for plug-connecting electrical connections for a device for driving an electrically driven compressor of a vaporous fluid, in particular an electric motor, which can be assembled easily and thus in a timesaving manner, wherein, in addition to the complexity of the installation, in particular the mounting space for the arrangement and thus also for example the required mounting space for the device are to be minimized. The arrangement is to comprise as few individual components as possible and is to be easy to construct, also with a view to minimizing the manufacturing costs. The device must be protected against dirt from the outside, also in order to maximize the service life of the device.

The task of the invention is solved by way of the objects with the features as described herein.

The task of the invention is solved by an arrangement according to the invention for plug-connecting electrical connections through a housing, in particular by a device for driving a compressor. The arrangement is produced with at least one plug-in connection with at least one plug-in connector for transmitting electrical energy, and one mounting element for accommodation of the at least one plug-in connector. The mounting element can be fixed on the housing.

According to the concept of the invention, the mounting element exhibits merely one opening on an inner side that is directed into a volume that is enclosed by the housing, which is intended for mounting a fastening element to fix the mounting element on the housing. The opening extends, starting from the inner surface, into the mounting element, and ends inside the mounting element. The fastening element is arranged in such a way that it is inserted into the opening from the volume enclosed by the housing through a pass-through opening, that is produced in the housing.

Consequently, the opening is produced preferably as a blind hole without connection to an outer surface of the mounting element, which is arranged opposite the inner surface.

According to a further embodiment of the invention, the inner surface of the mounting element exhibits an extension with the opening for mounting the fastening element, which protrudes into the volume that is enclosed by the housing. The extension and the opening are aligned, in particular orthogonally, towards a wall of the mounting element, which is arranged in a plane.

The extension exhibits preferably the form of a circular cylinder, in particular of a hollow circular cylinder, or the form of a truncated hollow cone, with an opening aligned in the axial direction, wherein the extension is on its first end face connected to the wall of the mounting element in such a way that the opening is closed.

The mounting element and the extension are produced preferably as a coherent unit and a one-piece component, in particular as a single-piece injection mold element. The opening, that exhibits the form of a blind hole and is intended inside the extension or the mounting element, is opened on the free second end face of the extension, which is produced distally to the first end face and protrudes into the volume that is enclosed by the housing.

According to an advantageous embodiment of the invention, a mounting sleeve for accommodation of the fastening element is arranged inside the opening. The mounting sleeve exhibits preferably and essentially the form of a hollow cylinder, wherein one outer form of the mounting sleeve corresponds in dimensions and design with one inner form of the opening.

The mounting sleeve is produced preferably and essentially in the form of a hollow circular cylinder, wherein one outer diameter of the mounting sleeve corresponds to one inner diameter of the circular cylindrical opening. The extension with the opening and the mounting sleeve are arranged to one another in particular coaxially.

A further advantage of the invention is that the mounting sleeve is integrated into the opening immovably, in particular with a form fit.

The mounting sleeve exhibits preferably a protruding end that is produced as a hollow-cylindrical circular ring and is arranged, in particular centrally between the end faces of the mounting sleeve, wherein one outer diameter of the protruding end is greater than one outer diameter of the mounting sleeve in the areas deviating from the protruding end so that the protruding end protrudes with its full circumference beyond one outer lateral surface of the mounting sleeve. The outer lateral surface of the mounting sleeve, together with the protruding end, corresponds with the inner surface of the opening in such a way that the mounting sleeve is prevented from shifting inside the opening in the axial direction.

The mounting sleeve that is produced preferably of a metal is integrated into the mounting element, that is intended preferably as an injection mold element, or arranged in such a way that it is surrounded by the mounting element, wherein the mounting element and the mounting sleeve are connected to one another with a form fit.

The protruding end can be produced on one outer lateral surface with a groove inside the opening of the mounting element, which runs in the axial direction and is intended as an anti-rotation device for the mounting sleeve in the circumferential direction.

One inner lateral surface of the mounting sleeve can exhibit an internal thread that corresponds with one external thread of a fastening element that is produced as a screw or threaded bolt. Thus, the extension of the mounting element with the opening, as well as the mounting sleeve integrated into the opening, and the fastening element constitute a screwed connection for fixing the mounting element on the housing.

According to a further embodiment of the invention, the arrangement is produced with one sealing element that acts in a radial direction, and one sealing element that acts in the axial direction, which fully encloses the mounting element in the radial direction, and is in the radial direction and the axial direction arranged between the housing and the mounting element.

The sealing element can be produced from an elastomer to be able to guarantee a hermetically sealing connection on the sealing surfaces.

The sealing element exhibits preferably one first area that acts in the radial direction and one second area that acts in the axial direction, wherein the sealing element is arranged in such a way that its first area encloses the mounting element in one circumferential direction completely and its second area is in contact with the mounting element in the axial direction.

The sealing element is positioned in the radial direction, in particular with its first area inside a pass-through opening of the housing between one lateral surface of a wall of the housing, which encloses the pass-through opening, and the mounting element, whereas the second area of the sealing element is arranged between the mounting element and one end face of the wall of the housing, which encloses the pass-through opening, and fully encloses the pass-through opening in the axial direction.

The first area of the sealing element is produced preferably and essentially in the shape of a hollow cylinder and is with one inner lateral surface in contact with the mounting element, wherein the first area of the sealing element can exhibit extensions on one outer lateral surface, which are produced as sealing lips that are elastically shaped in such a way that they are in contact with the lateral surface of the wall of the housing, which enclose the pass-through opening. The first area of the sealing element exhibits preferably three or four sealing lips that extend in the circumferential direction and are closed over their full circumference.

The second area of the sealing element is produced preferably in the form of a circular disc that is aligned orthogonally towards the first sealing area and connected with the first sealing area, wherein the second area of the sealing element can exhibit a thickening on both sides in the axial direction, extending over the full circumference without being interrupted. The thickenings are produced, in particular with equal diameters; the symmetry axes are preferably identical.

According to a preferred embodiment of the invention, one first plug-in connection is intended with first plug-in connectors and one second plug-in connection with second plug-in connectors for transmitting electrical energy in independent transmission areas, wherein the mounting element with the first plug-in connectors of the first plug-in connection and with the second plug-in connectors of the second plug-in connection are produced as an integral and coherent unit and a one-piece component.

According to a further embodiment of the invention, the plug-in connectors that are each produced preferably in the form of a straight pin are arranged inside a leadthrough that is produced in the mounting element, wherein each plug-in connector inside the leadthrough is enclosed by the mounting element preferably over the full circumference and connected to the mounting element in such a way that it is hermetically sealed.

The mounting element with the leadthroughs of the plug-in connectors is produced preferably as a coherent unit and single-piece component, in particular as a single-piece injection mold element.

According to an advantageous embodiment of the invention, the first plug-in connection exhibits two first plug-in connectors, whereas the second plug-in connection is produced with three second plug-in connectors.

The at least one plug-in connector is, starting from the inner surface of the mounting element, enclosed preferably by a stabilizing means in the axial direction, which exhibits a hollow cylindrical shape with an open end face, and at least one pin-like guide element, in particular at least two pin-like guide elements, wherein each guide element produced preferably as a straight pin protrudes beyond the open end face in the axial direction and is arranged in such a way that it is inserted into an opening that is intended in a printed-circuit board.

According to a further embodiment of the invention, the arrangement is produced with an interlock connection that is configured as an electrical lock and coupled with plug-in connectors of the plug-in connections in such a way that an electrically conductive connection is established. The interlock connection is fixed preferably on the mounting element and can, in the state when mounted, be arranged in such a way that it is at least partially integrated into the mounting element, wherein the mounting element exhibits preferably recesses that correspond with the outer form of the interlock connection. The recesses are produced preferably on a side of the mounting element which faces the plug-in connectors and is aligned towards a volume that is enclosed by the housing. Consequently, the interlock connection can be integrated and inserted into the recesses produced in the mounting element and then fixed.

According to a further preferred embodiment of the invention, the interlock connection is produced from busbars for connecting the appropriate plug-in connectors electrically. The ends of the busbars of the interlock connection, which are arranged in particular, in pairs are configured preferably in such a way that an electrical connection is established to the corresponding plug-in connectors.

Furthermore, the invention can exhibit a metallic shielding of the connecting lines of the high-voltage area, which is produced as a shielding cage, and is produced of at least one spring element as an electrical contact, which is arranged between the plug-in connectors of the plug-in connection for transmitting electrical energy in the high-voltage area, and the housing.

The task of the invention is also solved by way of a device according to the invention for driving a compressor of a vaporous fluid, in particular an electric motor. The device exhibits a rotor and a fixed stator, extending along a common longitudinal axis, and a housing.

The stator is positioned preferably in the radial direction on an outer surface of the rotor, enclosing the rotor.

According to the concept of the invention, the device is produced with a connection arrangement for supplying electrical energy to the stator with an arrangement according to the invention for plug-connecting electrical connections through the housing as described above.

The connection arrangement is intended preferably on a first end face of the stator, which is aligned in an axial direction. The end face aligned in the axial direction is arranged in a plane that extends vertically relative to the longitudinal axis, wherein the term 'axial direction' is to be understood as the direction of the longitudinal axis of the stator, which also corresponds to the longitudinal axis and the rotational axis of the rotor.

The task of the invention is also solved by a method according to the invention for mounting the arrangement for plug-connecting electrical connections through a housing, in particular a device for driving a compressor of a vaporous fluid, specifically an electric motor.

The method exhibits the following steps:
Insertion of at least one plug-in connector of at least one plug-in connection into one mounting element that is produced as a coherent unit and one-piece component, as well as hermetically sealed connection of the plug-in connector with the mounting element;
Bringing the mounting element with the at least one plug-in connector into the housing, wherein the mounting element is to be arranged in such a way that it is in contact with the housing, hermetically sealing it by way of merely one sealing element, and
Insertion of merely one fastening element from a volume enclosed by the housing through a pass-through opening, that is produced in the housing, into an opening that is aligned towards one inner surface of the mounting element, which is directed to the volume that is enclosed by the housing, and fixing of the mounting element on the housing.

According to a further embodiment of the invention, a mounting sleeve is to be arranged immovably inside the opening, wherein the mounting sleeve is connected with the mounting element preferably with a form fit, especially molded by way of injection molding when shaping the mounting element, and the mounting element that is produced preferably as a screw or threaded bolt, is inserted, in particular screwed into the mounting sleeve.

According to a preferred embodiment of the invention, the arrangement for plug-connecting electrical connections with the at least one plug-in connector ahead, that is aligned in the axial direction, is inserted into the housing through a pass-through opening, that is produced in the housing.

With preferably one free end arranged distally to the mounting element, each plug-in connector is electrically connected to the printed-circuit board.

The advantageous embodiment of the invention allows the use of the device for driving a compressor, in particular of an electric motor, for compressing a vaporous fluid for a compressor of a refrigerant in a refrigerant circuit of a motor vehicle air-conditioning system.

In summary, the arrangement according to the invention or the device according to the invention for driving a compressor of a vaporous fluid by way of the arrangement exhibits various further advantages:
Compared to arrangements from prior art, minimum number of components, because fastening elements, but also sealing elements are no longer necessary for example thanks to the use of the mounting element, which results in Minimal mounting space, in particular inside, but also outside the housing;

Minimal vulnerability to contamination from outside or no ingress of dirt from outside into the interior of the housing;

Straightforward assembly of the arrangement, and thus

Minimal efforts regarding assembly time, material costs, and manufacturing costs.

BRIEF DESCRIPTION OF DRAWINGS

Further details, features, and advantages of embodiments of the invention result from the following description of examples of embodiment with reference to the corresponding drawings. The illustrations show the following.

BEST MODE FOR CARRYING OUT THE INVENTION

Figure 1:
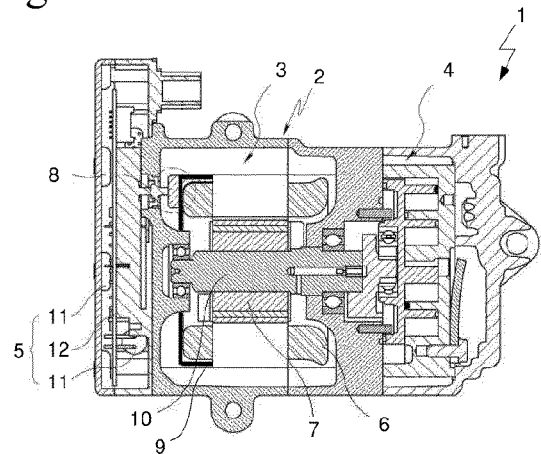
FIG. 1: An electrically driven compressor with an electric motor as a device for driving a compressing mechanism in a cross-sectional view.

FIG. 1 shows an electrically driven compressor 1 with an electric motor 3, that is arranged in a housing 2, as a device for driving a compressing mechanism 4 in a cross-sectional view. The electric motor 3 is supplied with electrical energy via a switching device 5.

The electric motor 3 exhibits a stator 6 with an essentially hollow-cylinder shaped stator core and coils wound on the stator core and a rotor 7 arranged inside the stator 6. The rotor 7 is set in rotary motion when electrical energy is supplied to the coils of the stator 6 via a connection arrangement. The connection arrangement 8 is produced on an end face of the stator 6 and exhibits a plurality of electrical connections.

A support element 9 for holding connection terminals with components of electrical connections between the coils of the electric motor 3 and the switching device 5 is arranged on the face end of the stator 6, which is produced with the connection arrangement 8. The connection terminals are produced with electrically conductive, pin-like plug-in connectors that connect connection lines of the coils with elements of the switching device 5 in such a way that an electrical contact is established.

The rotor 7 is arranged coaxially inside the stator 6 in such a way that it can be rotated around a rotational axis. A drive shaft 10 can be produced either integrally with the rotor 7 or as a separate element.

The electric motor 3 and the compressing mechanism produced as a scroll compressor with a fixed and an orbiting spiral 4 are arranged inside a volume enclosed by the housing 2, wherein the housing 2 is produced of one first housing element for accommodation of the electric motor 3, and one second housing element for accommodation of the compressing mechanism 4, and is produced preferably of a metal, in particular aluminum.

The orbiting spiral of the compressing mechanism 4 in which the vaporous fluid, specifically a refrigerant, is compressed is driven by way of the drive shaft 10 connected to the rotor 7 of the electric motor 3. According to an embodiment that is not represented here, the compressing mechanism can also be produced with a wobble plate.

The switching device 5 for controlling and regulating the operation of the electric motor 3 exhibits a printed-circuit board 12 that is produced with different switching elements 11 and bushings. Different control circuits and components that are supplied with electrical energy from an external power supply via a power line are mounted and electrically connected on the printed-circuit board 12. The bushings serve, in particular, for accommodation of plug-in connectors as the electrical connection between the plug-in connectors and the printed-circuit board 12.

Figure 2:
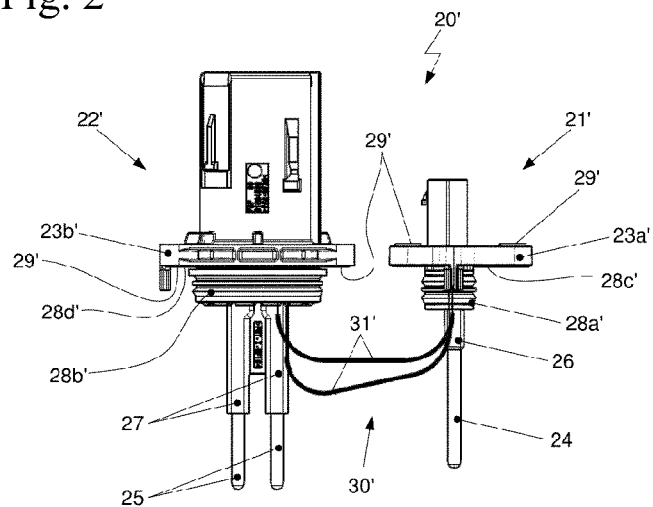
FIG. 2: An arrangement for plug-connecting electrical connections of an electric motor as a device for driving a compressor of a vaporous fluid with separately produced plug-in connections from prior art in a lateral view, as well as FIGS. 3A and 3B: One first plug-in connection of the arrangement for plug-connecting electrical connections from FIG. 2 in a lateral view, in a top view, and in a perspective view.
Figure 3A:
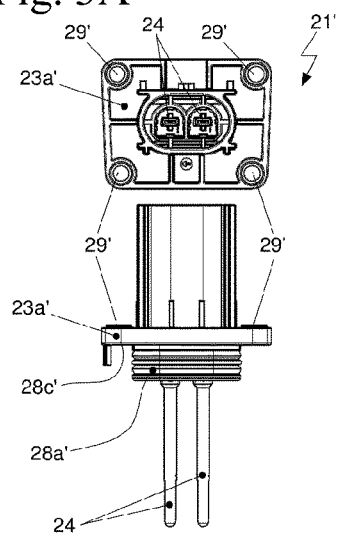
Figure 3B:
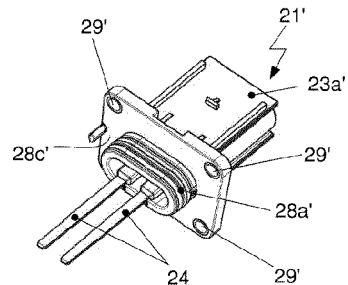
Figure 4A:
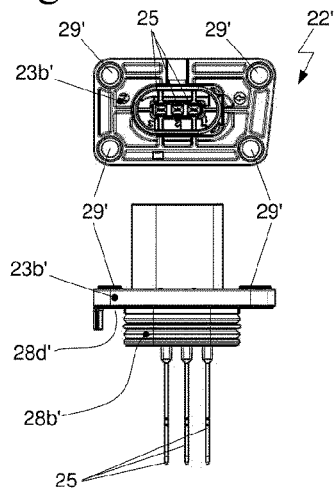
FIGS. 4A and 4B: One second plug-in connection of electrical connections of the arrangement from FIG. 2 in a lateral view, in a top view, and in a perspective view.
Figure 4B:
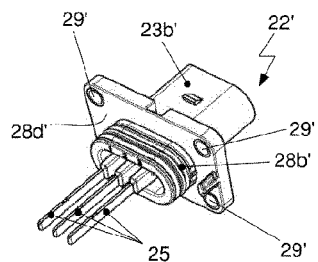

FIG. 2 shows an arrangement 20' for plug-connecting an inverter of an electric motor as a device for driving a compressor of a vaporous fluid 21', 22' from prior art in a lateral view, which are produced separately and hence separated from each other. FIGS. 3A and 3B show one first plug-in connection 21' of the arrangement 20' for plug-connecting from FIG. 2 in a lateral view, in a top view and in a perspective view, whereas one second plug-in connection 22' of the arrangement 20' for plug-connecting from FIG. 2 is also represented in a lateral view, in a top view and in a perspective view in FIGS. 4A and 4B.

The arrangement 20' for plug-connecting the electrical connections of the electric motor is produced with the first plug-in connection 21' for connections for transmitting electrical energy in a low-voltage area, and the second plug-in connection 22' for connections for transmitting electrical energy in a high-voltage area.

Each plug-in connection 21', 22' exhibits one mounting element 23a', 23b' for accommodation of plug-in connectors 24, 25, wherein the first plug-in connection 21' is provided with one first mounting element 23a' for accommodation of first plug-in connectors 24 for transmitting electrical energy in the low-voltage area and the second plug-in connection 22' with one second mounting element 23b' for accommodation of second plug-in connectors 25 for transmitting electrical energy in the high-voltage area. The plug-in connectors 24, 25 are each inserted into the mounting element 23a', 23b' inside a leadthrough 26, 27 and arranged in such a way that they are inserted through the mounting element 23a.', 23b'.

Furthermore, each mounting element 23a', 23b' of the plug-in connections 21', 22' is produced with one first sealing element 28a', 28b' that acts in the radial direction, and one second sealing element 28e, 28d' that acts in the axial direction.

The mounting elements 23a', 23b' are each connected to the housing by way of four fastening elements, for example screws, wherein each screw is arranged in such a way that it is inserted through a pass-through opening 29' that is produced in the mounting element 23a', 23b'.

Thus the arrangement 20' exhibits the two plug-in connections 21', 22' that are to be mounted separately and are produced in their entirety with at least eight fastening elements, in particular screws, as well as four sealing elements 28a', 281)% 28e, 28d', specifically two first sealing elements 28a', 28b' that act in the radial direction, and two second sealing elements 28e, 28d' that act in the axial direction, and thus a plurality of components.

The specification of the radial and of the axial directions refers each to the alignment of the plug-in connectors 24, 25 that are aligned in the longitudinal direction essentially parallel to each other, wherein the longitudinal direction of the plug-in connectors 24, 25 also corresponds to the axial direction of the plug-in connections 21', 22'. The radial direction is aligned orthogonally to the longitudinal direction of the plug-in connectors 24, 25 and thus towards the axial direction of the plug-in connections 21', 22'.

In addition, an interlock connection 30' produced as an electrical interlock can be produced between the first plug-in connection 21' and the second plug-in connection 22' for controlling the transmission of electrical energy in the low-voltage area and in the high-voltage area. The interlock connection 30' exhibits at least two electrically conductive connecting cables 31' that are each coupled on their ends via separate connections with the plug-in connections 21', 22' in such a way that an electrically conductive connection is established.

The interlock connection 30' as the power supply line connection facilitates, in particular shutting down of the high-voltage area once an electrical connection in the high-voltage area is interrupted in an undesired manner. With the early interruption of the current circuit, the interlock connection 30' consequently performs a safety-relevant function of the arrangement 20'.

After assembly of the plug-in connections 21', 22', the connecting cables 31' of the interlock connection 30' are routed freely and connected electrically on their ends to the plug-in connections 21', 22' by way of cable links. In addition, the connecting cables 31' are fixed on the housing and/or on the printed-circuit board by way of a fixing agent, in particular an adhesive.

Thus the arrangement 20' with the plug-in connections 21', 22' and a large number of components with complex structure also requires, in addition to a large mounting space, a long assembly time.

Figure 5A:
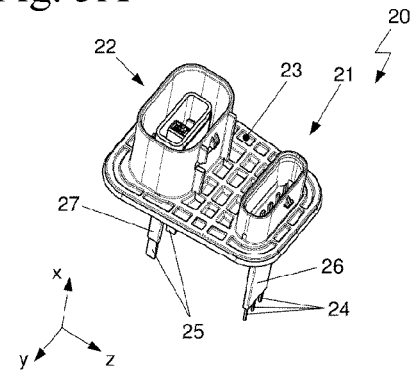
FIGS. 5A to 5E: Arrangements according to the invention for plug-connecting electrical connections of an electric motor in perspective views, as well as FIGS. 6A to 6D: The arrangement for plug-connecting electrical connections from the FIGS. 5A, 5C, and 5E in different lateral views and one top view.
Figure 5B:
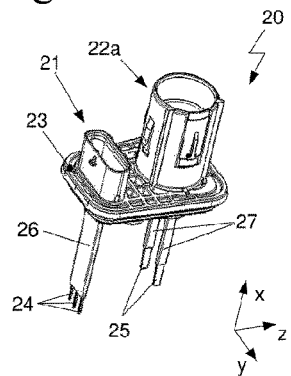
Figure 5C:
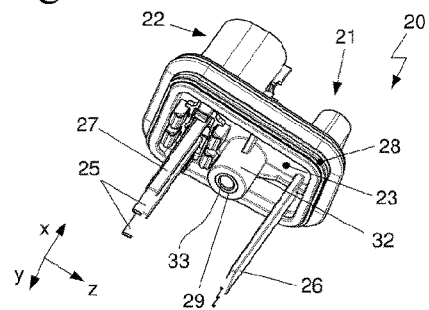
Figure 5D:
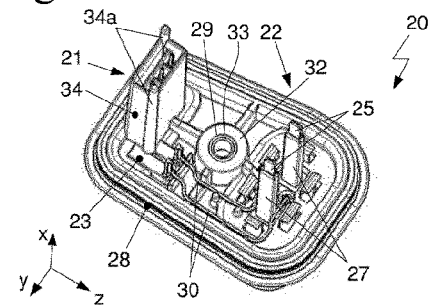
Figure 5E:
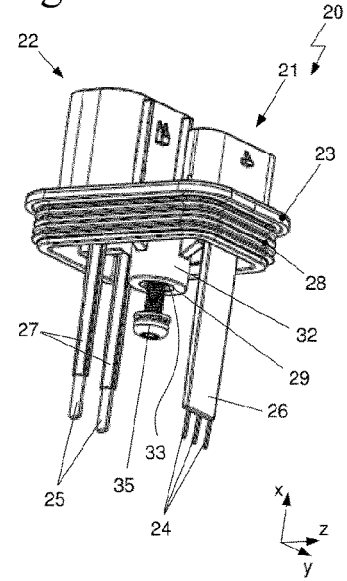
Figure 6A:
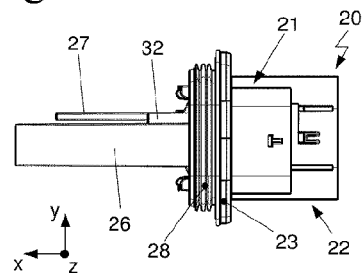
Figure 6B:
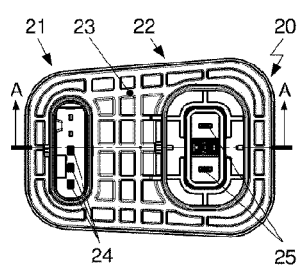
Figure 6C:
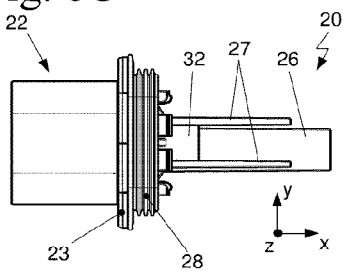
Figure 6D:
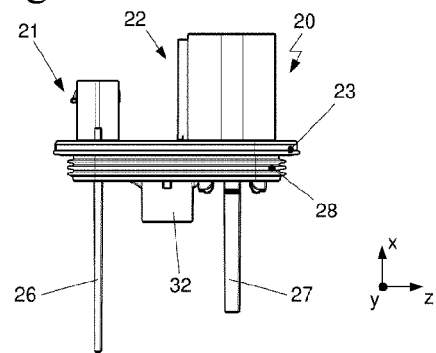
Figure 7A:
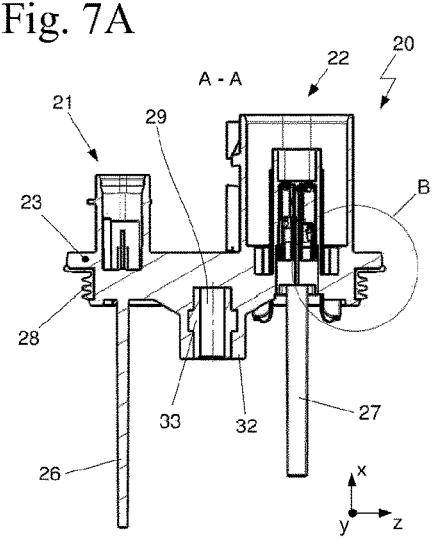
FIGS. 7A and 7B: Detail views of the arrangement for plug-connecting electrical connections from the FIGS. 6A to 6D with a sealing element in lateral cross-sectional views.
Figure 7B:
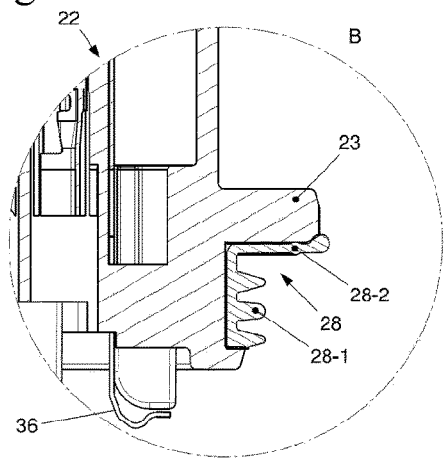

The FIGS. 5A to 5E show arrangements 20 according to the invention for plug-connecting electrical connections of an inverter of an electric motor in perspective views, whereas the FIGS. 6A to 6D show the arrangement 20 for plug-connecting electrical connections from the FIGS. 5A, 5C, and 5E in different lateral views and one top view, and the FIGS. 7A and 7B show detail views of the arrangement 20 from the FIGS. 6A to 6D with a sealing element 28 in lateral cross-sectional views. The FIGS. 8A to 8F show the arrangement 20 for plug-connecting electrical connections from the FIGS. 6A to 6D in combination with the housing 2 of the compressor in a perspective view according to FIG. 8A, as well as in perspective detail representations according to the FIGS. 8B to 8F, whereas the FIGS. 9A to 9E show the arrangement 20 from the FIGS. 6A to 6D in a state when mounted on the housing 2 of the compressor in different lateral views and one top view.

The arrangement 20 is produced as an integral component, combining the first plug-in connection 21 for transmitting electrical energy in the low-voltage area and the second plug-in connection 22, 22a for transmitting electrical energy in the high-voltage area in a common mounting element 23, wherein the first plug-in connection 21 and the second plug-in connection 22, 22a exhibit a common mounting element 23 for accommodation of the first plug-in connectors 24 and the second plug-in connectors 25. The plug-in connections 21, 22, 22a, in particular on the side that faces outside in the state when mounted on the housing of the compressor, can be produced with different contours protruding beyond the mounting element 23. The difference becomes clear by way of a comparison of the contours of the second plug-in connections 22, 22a, which are shown in the FIGS. 5A and 5B. Whereas the outer wall of the plug-in connection 22 according to FIG. 5A exhibits an essentially rectangular cross-section with corners that are rounded continuously and with the same radii in a plane that is spanned by the directions y and z, the form of the outer wall of the plug-in connection 22a according to FIG. 5B is circular in the plane spanned by the directions y and z. The walls of the plug-in connections 21, 22, 22a can consequently be produced differently, in particular with reference to the appropriate cross-section. In the further text, the arrangement 20 with the second plug-in connection 22 according to FIG. 5A is described.

The plug-in connectors 24, 25 that each exhibit the form of a straight pin are each inserted into the mounting element 23 inside a leadthrough 26, 27 and through the mounting element 23, wherein each plug-in connector 24, 25 inside the mounting element 23 of the arrangement 20 is fully enclosed by a leadthrough 26, 27 and thus arranged in such a way that it is hermetically sealed against the mounting element 23.

Each leadthrough 26, 27 constitutes a component or an area of the mounting element 23, wherein the mounting element 23 with the leadthroughs 26, 27 is produced as a coherent unit and one-piece component, in particular as a single-piece injection mold element. The single-piece form is achieved in a shaping process.

Figure 8A:
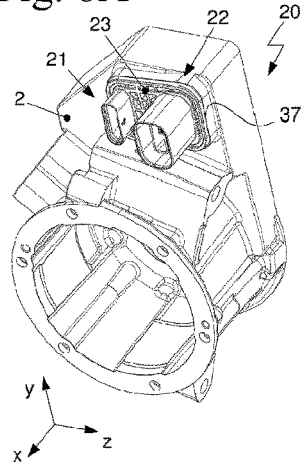
FIGS. 8A to 8F: The arrangement for plug-connecting electrical connections from the FIGS. 6A to 6D in combination with a housing of the compressor in a perspective view and in perspective detail representations.
Figure 8B:
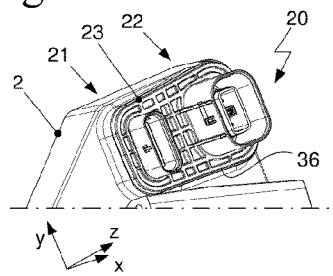
Figure 8C:
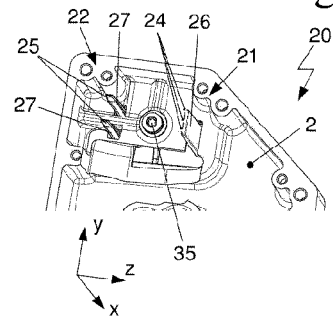
Figure 8D:
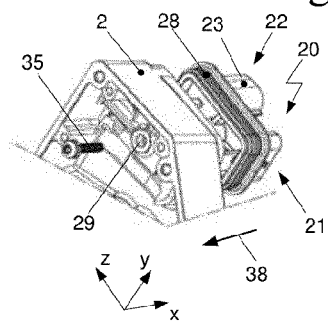

The mounting element 23 of the plug-in connections 21, 22 is produced with a sealing element 28 that acts both in the radial direction and in the axial direction. Thus, in addition to the plug-in connections 24, 25 that are arranged inside the leadthroughs 26, 27 and inserted through the housing 2 to the outside to the inverter or the printed-circuit board 12, as shown in FIG. 8D, the mounting element 23 itself is also sealed against the housing 2.

The sealing element 28 that is produced preferably of a duromer exhibits a first area 28-1 that acts in the radial direction, and a second area 28-2, that acts in the axial direction, which is shown, in particular in FIG. 7B, wherein the sealing element 28, fully enclosing the mounting element 23, is arranged with its first area 28-1 in such a way that it encloses the mounting element 23 in a circumferential direction and is arranged with its second area 28-2 in such a way that it is in contact with the mounting element 23 in the axial direction.

As also shown, in particular in FIG. 7B, the arrangement 20 exhibits a spring element 36 that, in the state when mounted, faces the housing 2. The spring element 36, that is produced of a metal and electrically connected with the second plug-in connectors 25 of the second plug-in connection 22 for transmitting electrical energy in the high-voltage area, is elastically shaped during the process of mounting, while being in contact with the housing 2. The second plug-in connectors 25 of the second plug-in connection 22 are electrically connected to the housing 2 by way of the spring element 36, which improves the shielding of the second plug-in connection 22 of the high-voltage area and the printed-circuit board 12 against the first plug-in connection 21 of the low-voltage area.

The inner surface of the mounting element 23 which, when the arrangement 20 is mounted on the housing 2, is aligned towards the volume enclosed by the housing 2, exhibits an extension 32 that protrudes into the volume. The extension 32 is produced on a wall of the mounting element 23, which is arranged on a plane that is spanned in the directions y and z, and is aligned in an x direction essentially orthogonally to the wall.

The extension 32 exhibits the form of a circular cylinder, in particular of a hollow circular cylinder, with an opening 29 for accommodation of a mounting sleeve 33 or a fastening element 35 for fixing the mounting element 23 on the housing 2, and is connected to the wall of the mounting element 23 on its first end face. The extension 32 and the mounting element 23 are produced as a coherent unit and a one-piece component, in particular as a single-piece injection mold element. The opening 29 intended inside the extension 32 constitutes a blind hole that is opened on the free second end face of the extension 32, which is produced distally to the first end face and faces the volume enclosed by the housing 2.

The mounting sleeve 33, that is also produced essentially in the form of a hollow circular cylinder, exhibits an outer diameter that corresponds to the inner diameter of the opening 29. The extension 32 in the form of a circular cylinder and the mounting sleeve 33 are aligned coaxially to each other and, in the area of the free second end face of the extension 32, preferably in line with the end faces. The mounting sleeve 33 is integrated into the extension 32 immovably, in particular in the axial direction and thus in the x direction.

The mounting element 23 and the mounting sleeve 33, that is produced from a metal, are connected to one another with a form fit, wherein the mounting sleeve 33 is embedded in the area of the extension 32 during injection molding of the mounting element 23.

The inner lateral surface of the mounting sleeve 33 exhibits an internal thread, that corresponds with the external thread of a fastening element 35, in particular of a fastening element 35, that is produced as a screw. The mounting sleeve 33 with the extension 32 of the mounting element 23, and the fastening element 35 constitute a screwed connection for fixing the mounting element 23 on the housing 2.

Figure 7C:
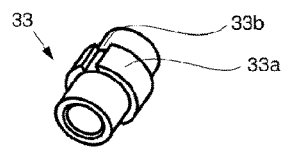
FIG. 7C: One mounting sleeve for accommodation of a fastening element with an anti-rotation device in a detail view.

FIG. 7C shows the mounting sleeve 33 for accommodation of the fastening element 35 with a protruding end 33a and an axial anti-rotation device 33b in a detail view.

The protruding end 33a is produced as a hollow-cylindrical circular ring that is arranged on the outer lateral surface of the mounting sleeve 33, preferably centrally between the end faces, and exhibits a groove running in the axial direction, wherein the outer diameter of the hollow circular cylindrical protruding end 33a is greater than the outer diameter of the mounting sleeve 33 in the remaining area so that the protruding end 33a protrudes beyond the outer lateral surface of the mounting sleeve 33 along its full circumference, which together with the protruding end 33a corresponds with the inner surface of the opening 29. The protruding end 33a exhibits a significantly lower extension in the axial direction than the mounting sleeve 33, thus preventing the mounting sleeve 33 from shifting inside the opening 29 in the axial direction.

The hollow-circular-cylinder-shaped protruding end 33a is opened over its full circumference. A slot with constant width is produced in the axial direction between the face ends of the protruding end 33a, which face each other in the circumferential direction. As the groove that exhibits an essentially rectangular cross-section and extends through the protruding end 33a in the axial direction, the slot intended inside the protruding end 33a constitutes the anti-rotation device 33b of the mounting sleeve 33 inside the opening 29 of the mounting element 23 in the circumferential direction. According to an alternative embodiment, that is not represented here, the anti-rotation device can also be produced of at least two grooves that are distributed over the circumference or a different type of form-fit connection.

Thus the arrangement 20 according to the invention exhibits one mounting element 23, that encloses the two plug-in connections 21, 22, which is produced with only one fastening element 35, in particular a screw, and one sealing element 28, specifically a sealing element 28 that acts both in the radial direction and in the axial direction, and thus a minimum number of components. The fastening element 35 is inserted from the interior of the housing 2 through the housing 2 into the mounting sleeve 33 in such a way that the mounting element 23 is screwed from the inside onto the housing 2.

Figure 8E:
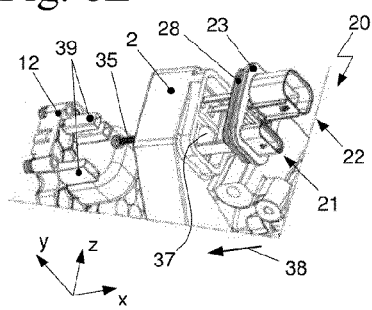

During the assembly, the arrangement 20, that combines the first plug-in connection 21 for transmitting electrical energy and communication signals in the low-voltage area and the second plug-in connection 22 for transmitting electrical energy in the high-voltage area in a common mounting element 23, is inserted with the plug connectors 24, 25 aligned in the axial direction x ahead into the housing 2 in the direction of movement 38, wherein the arrangement 20 is inserted with the sealing element 28 and the plug connectors 24, 25 ahead through a pass-through opening 37, that is produced in the housing 2, as shown in particular in FIGS. 8D and 8E. The printed-circuit board 12 is to be fitted with bushings that are produced as insertion slots 39 for accommodation of the plug-in connectors 24, 25.

During the assembly of the arrangement 20, each plug-in connector 24, 25 is inserted with its free end that is arranged distally to the mounting element 23 in the direction of movement 38 into an insertion slot 39, that is intended on the printed-circuit board 12, thus establishing an electrical connection of the plug-in connector 24, 25 to the printed-circuit board 12 or to the components that are arranged on the printed-circuit board 12.

For accommodation of a plug-in connector 24, 25, each insertion slot 39 is produced with a hollow-cylindrical wall that extends in the axial direction or in the direction of movement 38 and protrudes beyond the printed-circuit board 12. The wall of each insertion slot 39 is consequently produced with an end face that is aligned to the mounting element 23 in the axial direction and intended for mounting a plug-in connector 24, 25.

An interlock connection 30 for controlling the transmission of electrical energy in the low-voltage area and in the high-voltage area, which exhibits busbars and is produced as an electrical interlock, can be intended between the first plug-in connection 21 and the second plug-in connection 22, in particular according to the embodiment of the arrangement 20 according to FIG. 5D. In the state when mounted, the busbars arranged in pairs are arranged inside the mounting element 23, wherein the ends of the busbars are configured in such a way that an electrical contact is established with the corresponding plug-in connectors 24, 25. The busbars of the interlock connection 30 can be produced preferably as punched and formed sheets.

The mounting element 23 can exhibit recesses on one side, that is aligned to the plug-in connectors 24, 25 and thus into the volume enclosed by the housing 2, which correspond with the forms of the busbars. Thus, the individual busbars of the interlock connection 30 can be integrated into the recesses produced in the mounting element 23. The busbars can be inserted into the recesses of the mounting element 23 and fixed there.

With insertion of the busbars into the recesses of the mounting element 23, in particular with snapping into the desired position, the busbars can at the same time be brought into electrical contact with the corresponding plug-in connectors 24, 25 in such a way that electrically conductive connections are established between the corresponding plug-in connectors 24, 25 and the plug-in connections 21, 22 are coupled via an electrically conductive connection.

The busbars of the interlock connection 30 can be preassembled inside the mounting element 23. Subsequently, the arrangement 20 can be brought into the housing 2 of the compressor.

As also results in particular, from FIG. 5D, the first plug-in connectors 24 of the first plug-in connection 21 are in their entirety enclosed by a stabilizing means 34 in the axial direction, starting from the inner surface of the mounting element 23. The stabilizing means 34 that extends in the x direction and is produced in the form of a hollow cylinder exhibits an essentially rectangular cross-section. The stabilizing means 34 is on its first end face connected with the mounting element 23, and opened on an end face that is aligned distally to the first end face. On corners of the essentially rectangular cross-section, which are diagonally arranged opposite one another, the stabilizing means 34 exhibits guide elements 34a that are produced as straight pins and protrude beyond the second, opened end face of the stabilizing means 34.

Figure 8F:
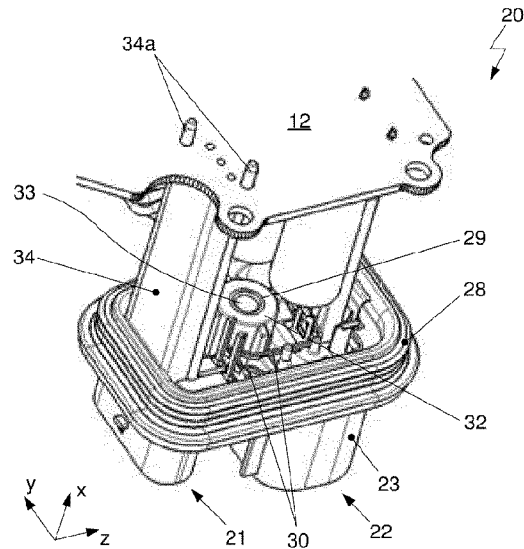
Figure 9A:
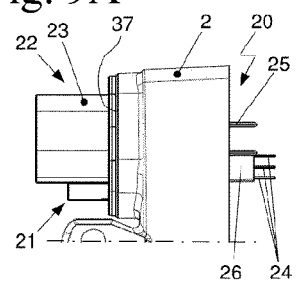
FIGS. 9A to 9E: The arrangement for plug-connecting electrical connections from the FIGS. 8A to 8F in a state when mounted on the housing of the compressor in different lateral views and one top view.
Figure 9B:
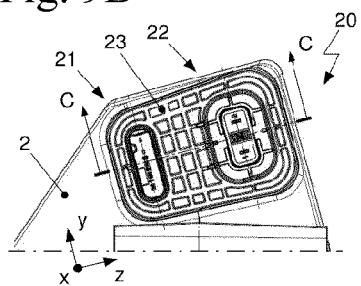
Figure 9C:
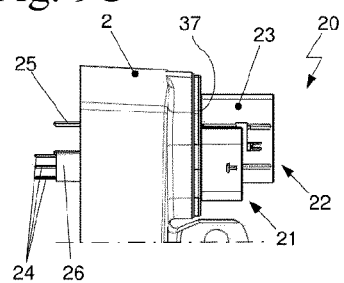
Figure 9D:
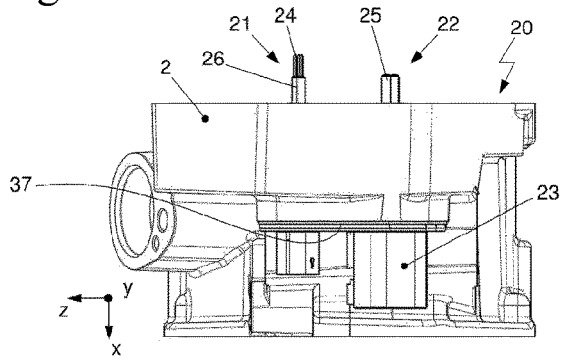
Figure 9E:
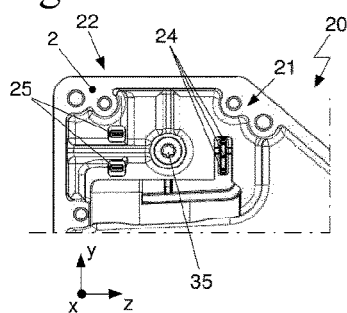

In the state when the arrangement 20 is fitted as shown in FIG. 8F, the second end face of the stabilizing means 34 is in contact with the printed-circuit board 12. The guide elements 34a that protrude beyond the stabilizing means 34 on the second end face are each inserted through an opening that is intended in the printed-circuit board 12.

When assembling the arrangement 20 according to FIG. 8E, the stabilizing means 34 and in particular, the guide elements 34a serve to facilitate insertion of the second plug-in connectors 25 with the free ends arranged distally to the mounting element 23 into the insertion slots 39 intended on the printed-circuit board 12.

Figure 10A:
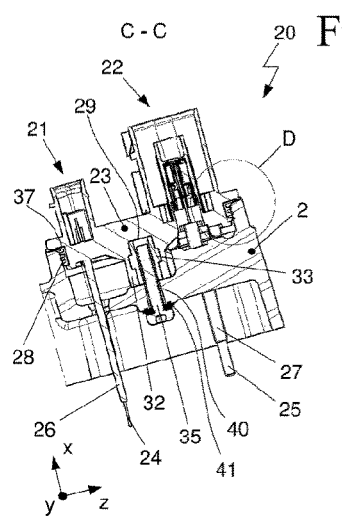
FIGS. 10A and 10B: Detail views of the arrangement for plug-connecting electrical connections in a state when mounted on the housing of the compressor in lateral cross-sectional views, as well as FIG. 11: The sealing element of the arrangement for plug-connecting electrical connections in a perspective view, a top view and a lateral view.
Figure 10B:
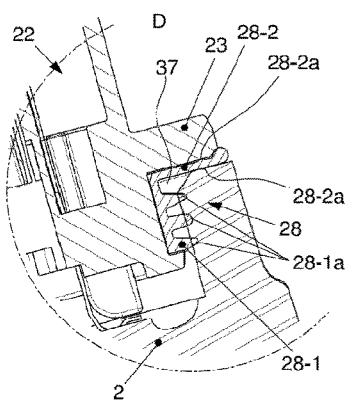
Figure 11:
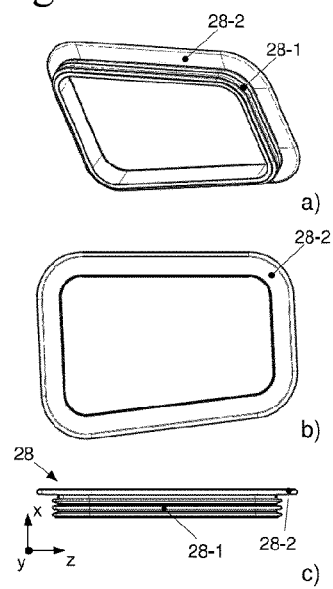

The FIGS. 10A and 10B show detail views of the arrangement 20 for plug-connecting electrical connections in the state when mounted on the housing 2 of the compressor in lateral cross-sectional views, whereas the FIGS. 11A to 11C show the sealing element 28 of the arrangement 20 for connecting electrical connections by way of plug-in connections in a perspective view, a top view, and a lateral view.

In the state when the arrangement 20 is fitted, the mounting element 23 is arranged in such a way that it closes the pass-through opening 37 of the housing 2 completely. The leadthroughs 26 of the first plug-in connectors 24 and the leadthroughs 27 of the second plug-in connectors 25 protrude into the volume enclosed by the housing 2.

The free end face of the extension 32 of the mounting element 23 is in contact with the housing 2, preferably over the full area. In a supporting area for the extension 32, which is arranged at a certain distance to the level of the pass-through opening 37 in the x direction, the housing 2 exhibits a pass-through opening 40 for insertion of the fastening element 35, which extends in the x direction. The supporting area is connected to the wall of the housing 2, which encloses the pass-through opening 37 over its full circumference, in particular by way of web-like connecting elements.

The fastening element 35 is screwed from the inside of the housing 2 through the pass-through opening 40 into the mounting sleeve 33, that is arranged in the extension 32 of the mounting element 23, thus connecting, specifically screwing the mounting element 23 onto the housing 2. An anti-rotation element 41, produced as a circlip and preventing the fastening element 35 from getting detached, is arranged between the fastening element 35 and the housing 2.

As also shown in particular, in FIG. 10B, in the state when the arrangement 20 is fitted, the first area 28-1 of the sealing element 28 is in contact with the housing 2 of the compressor in the radial direction inside the pass-through opening 37 between a lateral surface of a wall of the housing 2, which encloses the pass-through opening 37 and is also called radial sealing surface of the housing 2, and the mounting element 23, whereas the second area 28-2 of the sealing element 28 is arranged with its full circumference around the pass-through opening 37 between the mounting element 23 in the axial direction or in the x direction and thus in the direction of movement 38 and an end face of the wall of the housing 2, which encloses the pass-through opening 37 and is also called axial sealing surface of the housing 2.

The first area 28-1 of the sealing element 28, which acts in the radial direction and is produced essentially in the shape of a hollow circular cylinder, is with one inner lateral surface in contact with the mounting element 23 and exhibits extensions that are produced as sealing lips 28-1a on one outer lateral surface which during mounting of the arrangement 20 on the housing 2 of the compressor are elastically shaped, being in contact with the radial sealing surface of the housing 2. The sealing element 28 is produced preferably with three or four closed sealing lips 28-1a that extend in the circumferential direction.

During mounting of the arrangement 20 on the housing 2 of the compressor, the second area 28-2 of the sealing element 28, which acts in the axial direction, is elastically shaped in the outward radial direction between a chamfer produced on the mounting element 23 and the axial sealing surface of the housing 2. Furthermore, the second area 28-2 of the sealing element 28, which is produced as a circular disc, exhibits each a bulge-like, closed thickening 28-2a on both sides in the axial direction, which runs along the full circumference and exhibits equal diameters and equal symmetry axes so that the thickenings 28-2a are arranged opposite one another, wherein one first thickening 28-2a of the sealing element 28 is in contact with the mounting element 23, and one second thickening 28-2a of the sealing element 28 is in contact with the axial sealing surface of the housing 2.

Both the elastic shaping of the second area 28-2 of the sealing element 28 on the chamfer, that is produced in the area of the mounting element 23 and in the area of the thickenings 28-2a, and the elastic shaping of the sealing lips 28-1a of the first area 28-1 of the sealing element 28 are intended to further increase the leakproofness in the axial and in the radial directions.

Thanks to the fact that the arrangement 20 is produced with the sealing element 28, the housing 2 is hermetically sealed.

LIST OF REFERENCE SIGNS

1 Compressor
2 Housing
3 Electric motor
4 Compressing mechanism
5 Switching device
6 Stator with stator core
7 Rotor
8 Connection arrangement
9 Support element
10 Drive shaft
11 Switching element
12 Printed-circuit board
20, 20' Arrangement
21, 21' First low-voltage plug-in connection
22, 22a, 22' Second high-voltage plug-in connection
23 Mounting element for the plug-in connections 21, 22
23a' First mounting element for the first plug-in connection 21'
23b' Second mounting element for the second plug-in connection 22'
24 First plug-in connector of the first plug-in connection 21, 21'
25 Second plug-in connector of the second plug-in connection 22, 22'
26 Leadthrough for the first plug-in connectors 24
27 Leadthrough for the second plug-in connectors 25
28 Sealing element of the mounting element for the plug-in connections 21, 22
28-1 First area of the sealing element 28
28-1a Sealing lip
28-2 Second area of the sealing element 28
28-2a Thickening
28a' First sealing element of the first mounting element 23a'
28b' First sealing element of the second mounting element 23b'
28c' Second sealing element of the first mounting element 23a'
28d' Second sealing element of the second mounting element 23b'
29' Pass-through opening
29 Opening
30, 30' Interlock connection
31' Connecting cable
32 Extension on the mounting element 23
33 Mounting sleeve
33a Protruding end
33b Anti-rotation device
34 Stabilizing means
34a Guide element
35 Fastening element
36 Spring element
37 Pass-through opening in the housing 2
38 Direction of movement
39 Insertion slot
40 Pass-through opening in the fastening element of the housing 2
41 Anti-rotation element
x, y, z Direction

The invention claimed is:

1. An arrangement for plug-connecting electrical connections through a housing, in particular a device for driving a compressor, comprising:
at least one plug-in connection with at least one plug-in connector, for transmitting electrical energy; and
a mounting element for accommodation of the at least one plug-in connector, wherein the mounting element is produced in such a way that it can be fixed on the housing, wherein an inner surface that is directed into a volume enclosed by the housing exhibits an opening for accommodation of one fastening element for fixing the mounting element on the housing, wherein the opening is produced in such a way that it starts from the inner surface, extends into the mounting element and ends in the mounting element, and the fastening element is arranged in such a way that it is inserted into the opening from the volume enclosed by the housing through a pass-through opening, that is produced in the housing,
wherein a mounting sleeve for accommodation of the fastening element is arranged inside the opening,
wherein the mounting sleeve exhibits essentially a form of a hollow cylinder, wherein one outer form of the mounting sleeve corresponds to one inner form of the opening in dimensions and design,
wherein the mounting sleeve exhibits a protruding end that is produced as a hollow-cylindrical circular ring, wherein an outer diameter of the protruding end is greater than an outer diameter of the mounting sleeve in areas deviating from the protruding end so that the protruding end protrudes with its full circumference beyond an outer lateral surface of the mounting sleeve that, together with the protruding end, is produced in such a way that it corresponds with the inner surface of the opening,
wherein an outer lateral surface of the protruding end exhibits a groove that runs in an axial direction and is produced as an anti-rotation device of the mounting sleeve in the circumferential direction inside the opening of the mounting element.

2. The arrangement according to claim 1, wherein the inner surface of the mounting element exhibits an extension with the opening for accommodation of the fastening element, which protrudes into the volume that is enclosed by the housing.

3. The arrangement according to claim 2, wherein the extension exhibits a form of a circular cylinder or a form of a truncated hollow cone with the opening aligned in an axial direction, wherein the extension is on its first end face connected to a wall of the mounting element in such a way that the opening is closed.

4. The arrangement according to claim 1, wherein the mounting sleeve exhibits essentially the form of a hollow circular cylinder, wherein an outer diameter of the mounting sleeve corresponds to an inner diameter of a circular-cylindrical opening.

5. The arrangement according to claim 1, wherein the mounting sleeve is arranged in such a way that it is immovably integrated into the opening.

6. The arrangement according to claim 1, wherein an inner lateral surface of the mounting sleeve exhibits an internal thread that corresponds with an external thread of the fastening element that is produced as a screw or a threaded bolt.

7. An arrangement for plug-connecting electrical connections through a housing, in particular a device for driving a compressor, comprising:
    at least one plug-in connection with at least one plug-in connector, for transmitting electrical energy;
    a mounting element for accommodation of the at least one plug-in connector, wherein the mounting element is produced in such a way that it can be fixed on the housing, wherein an inner surface that is directed into a volume enclosed by the housing exhibits an opening for accommodation of one fastening element for fixing the mounting element on the housing, wherein the opening is produced in such a way that it starts from the inner surface, extends into the mounting element and ends in the mounting element, and the fastening element is arranged in such a way that it is inserted into the opening from the volume enclosed by the housing through a pass-through opening, that is produced in the housing; and
    a sealing element that acts in a radial direction and an axial direction fully encloses the mounting element in the radial direction and is arranged both in the radial direction and the axial direction between the housing and the mounting element,
    wherein the sealing element exhibits a first area that acts in the radial direction and a second area that acts in the axial direction, wherein the sealing element is arranged in such a way that it fully encloses the mounting element with the first area in a circumferential direction and is arranged with the second area in such a way that it is in contact with the mounting element in the axial direction.

8. The arrangement according to claim 7, wherein the sealing element is arranged in the radial direction with the first area inside a pass-through opening of the housing between a lateral surface of a wall of the housing, which encloses the pass-through opening, and the mounting element, and that the sealing element is arranged in the axial direction with the second area along its full circumference around the pass-through opening between the mounting element and an end face of the wall of the housing, which encloses the pass-through opening.

9. The arrangement according to claim 8, wherein the first area of the sealing element is produced essentially in a shape of a hollow cylinder and is arranged in such a way that an inner lateral surface is in contact with the mounting element.

10. The arrangement according to claim 9, wherein the first area of the sealing element exhibits extensions on an outer lateral surface, which are produced as sealing lips that are elastically shaped in such a way that they are in contact with the lateral surface of the wall of the housing, which encloses the pass-through opening.

11. The arrangement according to claim 7, wherein the second area of the sealing element exhibits a form of a circular disc that is arranged in such a way that it is aligned orthogonally to the first sealing area and is connected with the first sealing area.

12. The arrangement according to claim 11, wherein the second area of the sealing element exhibits each a thickening on both sides in the axial direction, which runs over a full circumference and is produced without interruptions.

13. An arrangement for plug-connecting electrical connections through a housing, in particular a device for driving a compressor, comprising:
    at least one plug-in connection with at least one plug-in connector, for transmitting electrical energy; and
    a mounting element for accommodation of the at least one plug-in connector, wherein the mounting element is produced in such a way that it can be fixed on the housing, wherein an inner surface that is directed into a volume enclosed by the housing exhibits an opening for accommodation of one fastening element for fixing the mounting element on the housing, wherein the opening is produced in such a way that it starts from the inner surface, extends into the mounting element and ends in the mounting element, and the fastening element is arranged in such a way that it is inserted into the opening from the volume enclosed by the housing through a pass-through opening, that is produced in the housing, wherein the at least one plug-in connection includes a first plug-in connection and a second plug-in connection, the at least one plug-in connector includes first plug-in connectors and second plug-in connectors, and the first plug-in connection is produced with the first plug-in connectors, and the second plug-in connection is produced with the second plug-in connectors for transmitting electrical energy in independent transmission areas, wherein the mounting element with the first plug-in connectors of the first plug-in connection, and the second plug-in connectors of the second plug-in connection is produced as an integral and coherent unit and a one-piece component,
    wherein the first plug-in connectors and the second plug-in connectors are produced in a form of a straight pin,
    wherein each of the first plug-in connectors and the second plug-in connectors is arranged inside a lead-through produced in the mounting element,
    wherein each of the first plug-in connectors and the second plug-in connectors is arranged in the lead-through in such a way that it is fully enclosed by the mounting element and is hermetically sealed against the mounting element.

14. The arrangement according to claim 13, wherein the mounting element with the leadthroughs is produced as a coherent unit and a one-piece component.

15. An arrangement for plug-connecting electrical connections through a housing, in particular a device for driving a compressor, comprising:
    at least one plug-in connection with at least one plug-in connector, for transmitting electrical energy; and
    a mounting element for accommodation of the at least one plug-in connector, wherein the mounting element is produced in such a way that it can be fixed on the housing, wherein an inner surface that is directed into a volume enclosed by the housing exhibits an opening for accommodation of one fastening element for fixing the mounting element on the housing, wherein the opening is produced in such a way that it starts from the inner surface, extends into the mounting element and ends in the mounting element, and the fastening element is arranged in such a way that it is inserted into the opening from the volume enclosed by the housing through a pass-through opening, that is produced in the housing, wherein the at least one plug-in connection includes a first plug-in connection and a second plug-in connection, the at least one plug-in connector includes first plug-in connectors and second plug-in connectors, and the first plug-in connection is produced with the first plug-in connectors, and the second plug-in connection is produced with the second plug-in connectors for transmitting electrical energy in independent transmission areas, wherein the mounting element with the first plug-in connectors of the first plug-in connection, and the second plug-in connectors of the second plug-in connection is produced as an integral and coherent unit and a one-piece component, wherein the first plug-in connectors are provided in two, and the first plug-in connection is produced with the two first plug-in connectors.

16. The arrangement according to claim 15, wherein the second plug-in connectors are provided in three, and the second plug-in connection is produced with the three second plug-in connectors.

17. The arrangement according to claim 16, wherein the first plug-in connectors and the second plug-in connectors are produced in such a way that, starting from an inner side of the mounting element, in an axial direction enclosed by a stabilizing means that exhibits a hollow-cylindrical form with an open end face and at least one pin-like guide element, wherein the guide element is produced in such a way that it protrudes beyond the open end face as a straight pin and is arranged in such a way that it is inserted through an opening that is produced in a printed-circuit board.

18. A device for driving the compressor of a vaporous fluid, in particular an electric motor, comprising:
a housing, a stator and a rotor, which are arranged in such a way that they extend along a common longitudinal axis, wherein a connection arrangement for supplying electrical energy to the stator is produced with an arrangement for plug-connecting electrical connections through the housing, in particular a device for driving a compressor, comprising:
at least one plug-in connection with at least one plug-in connector, for transmitting electrical energy; and
a mounting element for accommodation of the at least one plug-in connector, wherein the mounting element is produced in such a way that it can be fixed on the housing, wherein an inner surface that is directed into a volume enclosed by the housing exhibits an opening for accommodation of one fastening element for fixing the mounting element on the housing, wherein the opening is produced in such a way that it starts from the inner surface, extends into the mounting element and ends in the mounting element, and the fastening element is arranged in such a way that it is inserted into the opening from the volume enclosed by the housing through a pass-through opening, that is produced in the housing.

19. A method for mounting the arrangement for plug-connecting electrical connections through a housing according to claim 18, comprising steps:
insertion of the at least one plug-in connector of the at least one plug-in connection into the mounting element that is produced as a coherent unit and one-piece component, and hermetically sealed connection of the at least one plug-in connector with the mounting element;
bringing of the mounting element with the at least one plug-in connector into the housing, wherein the mounting element is to be arranged in such a way that it is in contact with the housing such that the housing is hermetically sealed by way of a sealing element, and
insertion of the fastening element into the opening from the volume enclosed by the housing through the pass-through opening that is produced in the housing that is aligned towards the inner surface of the mounting element, which is directed to the volume that is enclosed by the housing and fixing of the mounting element on the housing.

20. The method according to claim 19, wherein a mounting sleeve is arranged immovably inside the opening and the fastening element is inserted into the mounting sleeve.

21. The method according to claim 19, wherein the arrangement is with the at least one plug-in connector ahead, which is arranged in such a way that it is aligned in an axial direction, inserted through the housing into the pass-through opening that is produced in the housing.

22. The method according to claim 19, wherein the at least one plug-in connector is with one free end that is arranged distally to the mounting element electrically connected to a printed-circuit board.

23. A use of a device for driving the compressor, in particular an electric motor, for compressing a vaporous fluid, according to claim 18 for compressing of a refrigerant in a refrigerant circuit of a motor vehicle air-conditioning system.

* * * * *